(12) United States Patent
Sakai

(10) Patent No.: US 12,424,387 B2
(45) Date of Patent: Sep. 23, 2025

(54) MULTILAYER CERAMIC ELECTRONIC COMPONENT AND CIRCUIT BOARD

(71) Applicant: TAIYO YUDEN CO., LTD., Tokyo (JP)

(72) Inventor: Tomoki Sakai, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 139 days.

(21) Appl. No.: 18/187,246

(22) Filed: Mar. 21, 2023

(65) Prior Publication Data

US 2023/0326676 A1  Oct. 12, 2023

(30) Foreign Application Priority Data

Apr. 12, 2022  (JP) ................................ 2022-065486

(51) Int. Cl.
*H01G 4/232* (2006.01)
*H01G 2/06* (2006.01)
*H01G 4/248* (2006.01)
*H01G 4/30* (2006.01)

(52) U.S. Cl.
CPC ............. *H01G 4/2325* (2013.01); *H01G 2/06* (2013.01); *H01G 4/248* (2013.01); *H01G 4/30* (2013.01)

(58) Field of Classification Search
None
See application file for complete search history.

(56) References Cited

U.S. PATENT DOCUMENTS

| 7,295,421 | B2* | 11/2007 | Mihara | H01G 4/232 |
| | | | | 361/309 |
| 10,325,725 | B2* | 6/2019 | Seo | H01G 4/30 |
| 10,373,759 | B1* | 8/2019 | Choi | H05K 1/181 |
| 10,504,653 | B1* | 12/2019 | Park | H01G 4/232 |
| 11,715,604 | B2* | 8/2023 | Sakai | H01G 4/012 |
| | | | | 361/321.2 |
| 11,967,466 | B2* | 4/2024 | Jeong | H01G 4/232 |
| 12,131,870 | B2* | 10/2024 | Sakai | H01G 4/008 |
| 2010/0092740 | A1* | 4/2010 | Motoki | C25D 5/12 |
| | | | | 428/209 |
| 2019/0287720 | A1* | 9/2019 | Mori | H01G 4/232 |
| 2020/0082983 | A1* | 3/2020 | Kim | H01G 4/012 |
| 2020/0152387 | A1* | 5/2020 | Takeuchi | H01G 4/1245 |

(Continued)

FOREIGN PATENT DOCUMENTS

JP 2021-034440 A 3/2021

*Primary Examiner* — Dion R. Ferguson
(74) *Attorney, Agent, or Firm* — CHEN YOSHIMURA LLP

(57) ABSTRACT

A multilayer ceramic electronic component includes a ceramic body having internal electrodes stacked in a direction of a first axis, and end surfaces perpendicular to a second axis orthogonal to the first axis, and external electrodes covering the end surfaces of the ceramic body, respectively, wherein each of the external electrodes includes a base film formed on a corresponding one of the end surfaces and connected to the plurality of internal electrodes that are led out to the corresponding end surface, a first Ni film formed on the base film, a second Ni film formed on the first Ni film, a surface layer film formed on the second Ni film, and a metal film that is formed between the first Ni film and the second Ni film and contains a metal having a Young's modulus lower than that of Ni, as a main component.

12 Claims, 7 Drawing Sheets

(56) References Cited

U.S. PATENT DOCUMENTS

| | | | |
|---|---|---|---|
| 2021/0020368 A1* | 1/2021 | Yoshino | H01G 4/232 |
| 2021/0057155 A1* | 2/2021 | Zenzai | H01G 4/008 |
| 2023/0070005 A1* | 3/2023 | Murai | H01G 4/248 |
| 2023/0326676 A1* | 10/2023 | Sakai | H01G 4/232 |
| 2023/0326681 A1* | 10/2023 | Sakai | H01G 4/012 |
| | | | 361/321.2 |
| 2023/0326682 A1* | 10/2023 | Sakai | H01G 4/12 |

* cited by examiner

MULTILAYER CERAMIC ELECTRONIC COMPONENT AND CIRCUIT BOARD

FIELD

A certain aspect of the present disclosure relates to a multilayer ceramic electronic component and a circuit board using the same.

BACKGROUND

A typical multilayer ceramic capacitor has a structure in which external electrodes are provided on the surface of a ceramic body. In a multilayer ceramic capacitor mounted on a substrate, cracks are likely to occur in the ceramic body and the external electrodes because of stress applied in association with deflection of the substrate and temperature changes. Multilayer ceramic capacitors in which such cracks have occurred are likely to have problems such as reduced capacitance, reduced insulation resistance, and reduced connection strength to the substrate.

In contrast, Japanese Patent Application Laid-Open No. 2021-034440 (Patent Document 1) discloses a technique capable of inhibiting occurrence of cracks in multilayer ceramic capacitors. Specifically, in the disclosed multilayer ceramic capacitor, a flexible conductive resin layer is used as a part of the external electrode. As a result, in the disclosed multilayer ceramic capacitor, the conductive resin layer acts to relax the stress applied to the ceramic body and the external electrodes, thereby inhibiting occurrence of cracks.

RELATED ART DOCUMENTS

Patent Documents

Japanese Patent Application Laid-Open No. 2021-034440

SUMMARY

However, in the technique in which the conductive resin layer is used as part of the external electrode, the bonding strength between different materials of the conductive resin layer and the metal layer is insufficient, so that the conductive resin layer may be partially peeled off. In such a case, in the multilayer ceramic capacitor, a decrease in insulation resistance or migration is likely to occur because of moisture entering from the portion where the peeling of the conductive resin layer occurs.

An object of the present disclosure is to provide a technique for improving the reliability of a multilayer ceramic electronic component.

In one aspect of the present disclosure, there is provided a multilayer ceramic electronic component including: a ceramic body having a plurality of internal electrodes stacked in a direction of a first axis, and end surfaces perpendicular to a second axis orthogonal to the first axis, the plurality of internal electrodes being alternately led out to the end surfaces; and external electrodes covering the end surfaces of the ceramic body, respectively, wherein each of the external electrodes includes: a base film formed on a corresponding one of the end surfaces and connected to the plurality of internal electrodes that are led out to the corresponding end surface, a first Ni film formed on the base film, a second Ni film formed on the first Ni film, a surface layer film formed on the second Ni film, and a metal film that is formed between the first Ni film and the second Ni film and contains a metal having a Young's modulus lower than that of Ni, as a main component.

In this multilayer ceramic electronic component, the metal layer that contains a metal having a lower Young's modulus than Ni and is softer than Ni is provided between the first Ni film and the second Ni film. In this configuration, the metal layer acts to relax the stress applied to the ceramic body and the external electrodes, thereby inhibiting the occurrence of cracks. In addition, in this configuration, even if the metal layer is partially peeled off, since the base film is covered with the first Ni film, deterioration in moisture resistance is less likely to occur. Furthermore, in this configuration, even if the surface of the metal film is oxidized by the heat treatment, by forming the second Ni film after the heat treatment, the adhesion of the surface layer film and high solder wettability during substrate mounting can be obtained on the surface of the second Ni film.

In each of the external electrodes, the metal film may be located on at least one of a pair of end sections of three sections that are defined by dividing the ceramic body into three equal parts in the direction of the first axis.

The metal film may be provided across the entirety of the first Ni film.

The metal film may contain at least one of In, Bi, Al, Sn, Zn, Au, Ag, Pd, Cu, Ti, or Pt as a main component.

The thickness of the metal film may be 0.1 μm or greater and 10.0 μm or less.

The thickness of the first Ni film may be 1.0 μm or greater and 10.0 μm or less.

The thickness of the second Ni film may be 0.5 μm or greater and 10.0 μm or less.

The base film may contain Cu as a main component.

The thickness of the base film may be 2 μm or greater and 50 μm or less.

The surface layer film may contain Sn as a main component.

The thickness of the surface layer film may be 3 μm or greater and 10 μm or less.

In another aspect of the present disclosure, there is provided a circuit board including: a mounting substrate; a multilayer ceramic electronic component that includes: a ceramic body having a plurality of internal electrodes stacked in a direction of a first axis, and end surfaces perpendicular to a second axis perpendicular to the first axis, the plurality of internal electrodes being alternately led out to the end surfaces, and external electrodes covering the end surfaces of the ceramic body, respectively; and solder connecting the external electrodes and the mounting substrate, wherein each of the external electrodes includes: a base film formed on a corresponding one of the end surfaces and connected to the plurality of internal electrodes that are led out to the corresponding end surface, a first Ni film formed on the base film, a second Ni film formed on the first Ni film, a surface layer film formed on the second Ni film, and a metal film that is formed between the first Ni film and the second Ni film and contains a metal having a Young's modulus lower than that of Ni, as a main component.

DETAILED DESCRIPTION

Figure 1:
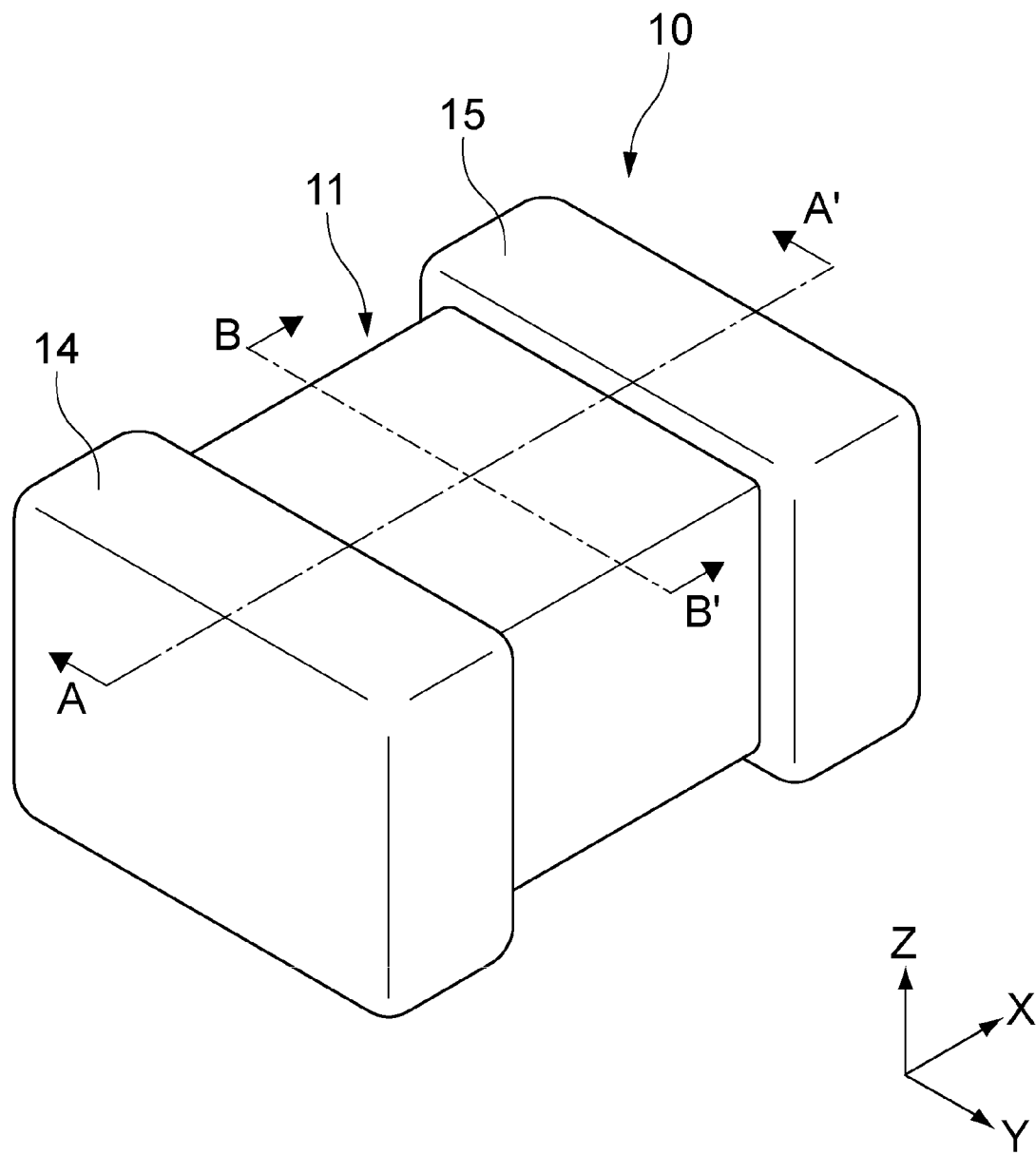
FIG. 1 is a perspective view schematically illustrating a multilayer ceramic capacitor in accordance with an embodiment.

Hereinafter, embodiments will be described with reference to the drawings. In the drawings, an X-axis, a Y-axis, and a Z-axis that are orthogonal to each other are illustrated as appropriate. The X-axis, Y-axis, and Z-axis are common in all drawings.

Configuration of a Multilayer Ceramic Capacitor 10

Figure 2:
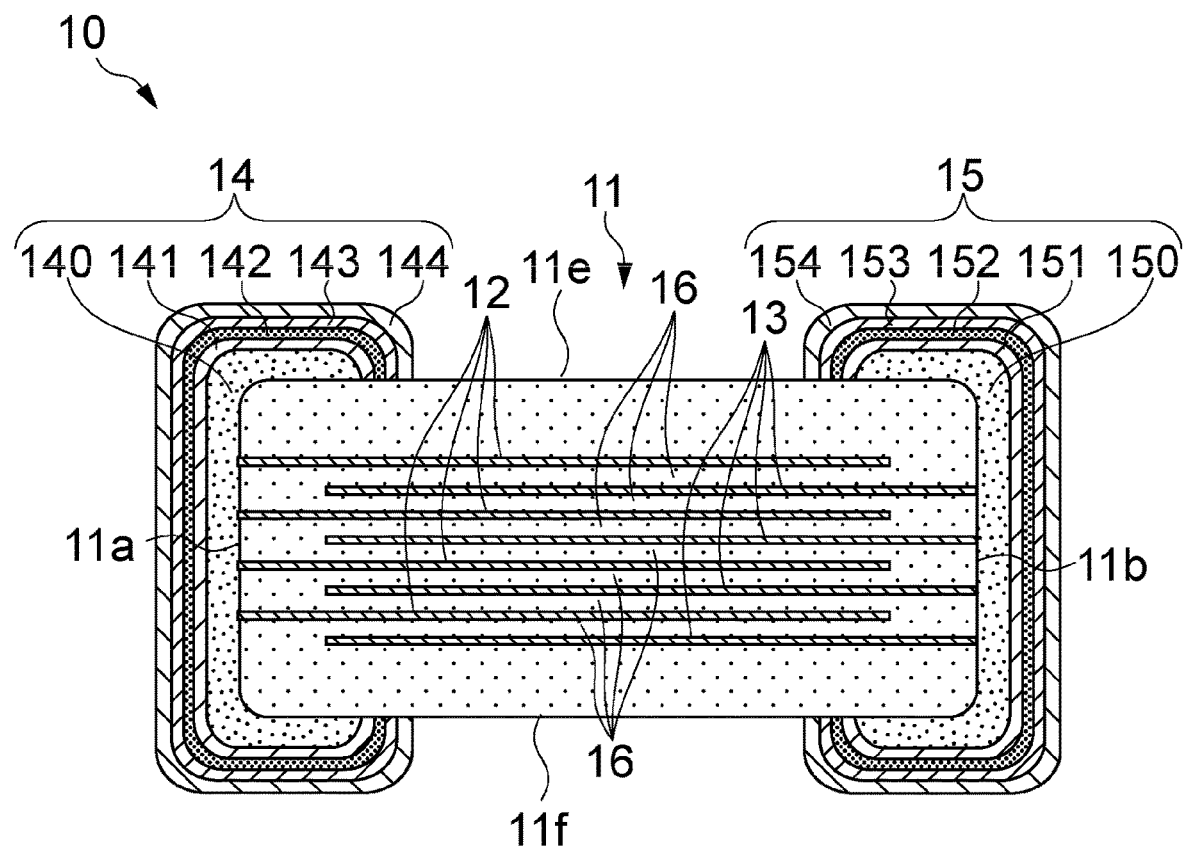
FIG. 2 is a cross-sectional view of the multilayer ceramic capacitor taken along line A-A' in FIG. 1.
Figure 3:
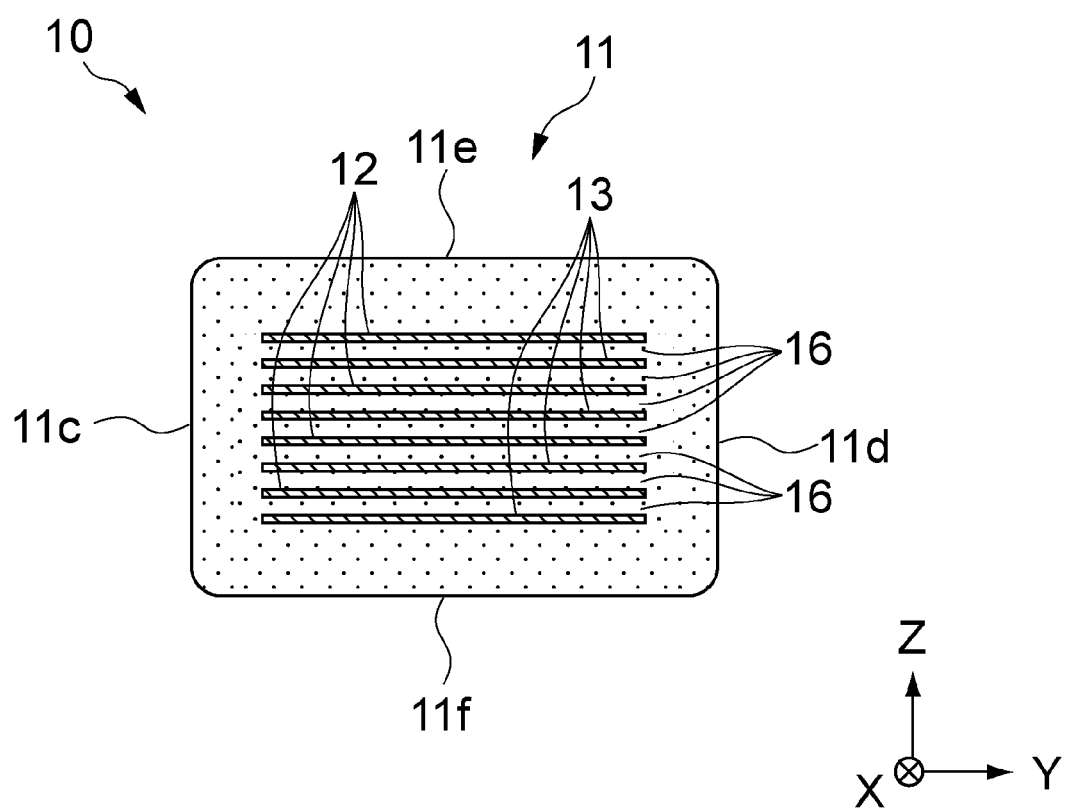
FIG. 3 is a cross-sectional view of the multilayer ceramic capacitor taken along line B-B' in FIG. 1.

FIG. 1 is a perspective view of the multilayer ceramic capacitor 10. FIG. 2 is a cross-sectional view of the multilayer ceramic capacitor 10 taken along line A-A' in FIG. 1. FIG. 3 is a cross-sectional view of the multilayer ceramic capacitor 10 taken along line B-B' in FIG. 1.

The multilayer ceramic capacitor 10 includes a ceramic body 11, a first external electrode 14, and a second external electrode 15. The surfaces of the ceramic body 11 typically include a first end surface 11a and a second end surface 11b facing the X-axis direction, a first side surface 11c and a second side surface 11d facing the Y-axis direction, and a first principal surface 11e and a second principal surface 11f facing the Z-axis direction. More specifically, the first end surface 11a faces a direction parallel to the X-axis direction, and the second end surface 11b faces a direction that is parallel to the X-axis direction and opposite to the direction that the first end surface 11a faces. The first side surface 11c faces a direction parallel to the Y-axis direction, and the second side surface 11d faces a direction that is parallel to the Y-axis direction and opposite to the direction that the first side surface 11c faces. The first principal surface 11e faces a direction parallel to the Z-axis direction, and the second principal surface 11f faces a direction that is parallel to the Z-axis direction and opposite to the direction that the first principal surface 11e faces. The first end surface 11a and the second end surface 11b extend along the Y-axis direction and the Z-axis direction. The first side surface 11c and the second side surface 11d extend along the Z-axis direction and the X-axis direction. The first principal surface 11e and the second principal surface 11f extend along the X-axis direction and the Y-axis direction.

The first end surface 11a and the second end surface 11b, the first side surface 11c and the second side surface 11d, and the first principal surface 11e and the second principal surface 11f of the ceramic body 11 are all flat surfaces. The flat surface in the present embodiment does not have to be strictly a flat surface as long as it is recognized as flat when viewed as a whole, and includes a surface having a minute uneven shape on the surface and a surface having a gently curved surface.

The ceramic body 11 has ridge portions connecting the first and second end surfaces 11a and 11b, the first and second side surfaces 11c and 11d, and the first and second principal surfaces 11e and 11f. The ridge portions are chamfered and rounded, for example, but do not have to be chamfered.

The ceramic body 11 is made of dielectric ceramic. The ceramic body 11 has first internal electrodes 12 and second internal electrodes 13 that are covered with dielectric ceramic and stacked in the Z-axis direction. The plurality of the internal electrodes 12 and 13 each have a sheet shape extending along the XY plane, and are alternately arranged along the Z-axis direction.

In other words, the ceramic body 11 has an opposing section where the internal electrodes 12 and 13 face each other in the Z-axis direction with ceramic layers 16 interposed therebetween. The first internal electrodes 12 are led out from the opposing section to the first end surface 11a and connected to the first external electrode 14. The second internal electrodes 13 are led out from the opposing section to the second end surface 11b and connected to the second external electrode 15.

With such a configuration, in the multilayer ceramic capacitor 10, when a voltage is applied between the first external electrode 14 and the second external electrode 15, the voltage is applied to the plurality of the ceramic layers 16 in the opposing section of the internal electrodes 12 and 13. As a result, in the multilayer ceramic capacitor 10, electric charge corresponding to the voltage between the first external electrode 14 and the second external electrode 15 is stored.

In the ceramic body 11, dielectric ceramic with a high dielectric constant is used in order to increase the capacitance of each ceramic layer 16 between the internal electrodes 12 and 13. Examples of the dielectric ceramic with a high dielectric constant include a material having a perovskite structure containing barium (Ba) and titanium (Ti), typified by barium titanate ($BaTiO_3$).

The dielectric ceramic may be strontium titanate ($SrTiO_3$), calcium titanate ($CaTiO_3$), magnesium titanate ($MgTiO_3$), calcium zirconate ($CaZrO_3$), calcium zirconate titanate $Ca(Zr, Ti)O_3$, barium zirconate ($BaZrO_3$), or titanium oxide ($TiO_2$).

The first external electrode 14 is disposed on the surface of the ceramic body 11 and covers the first end surface 11a. The second external electrode 15 is disposed on the surface of the ceramic body 11 and covers the second end surface 11b. The external electrodes 14 and 15 face each other in the X-axis direction with the ceramic body 11 interposed therebetween, and function as terminals of the multilayer ceramic capacitor 10.

The external electrodes 14 and 15 extend inward in the X-axis direction from the respective end surfaces 11a and 11b of the ceramic body 11 along the principal surfaces 11e and 11f and the side surfaces 11c and 11d. The external electrodes 14 and 15 are spaced apart from each other on the principal surfaces 11e and 11f and the side surfaces 11c and 11d.

The first external electrode 14 has a five-layer structure and includes a base film 140, a first Ni film 141, a metal film 142, a second Ni film 143, and a surface layer film 144. In the first external electrode 14, the base film 140, the first Ni film 141, the metal film 142, the second Ni film 143, and the surface layer film 144 are stacked in this order from the ceramic body 11 side.

The second external electrode 15 has a five-layer structure and includes a base film 150, a first Ni film 151, a metal film 152, a second Ni film 153, and a surface layer film 154. In the second external electrode 15, the base film 150, the first Ni film 151, the metal film 152, the second Ni film 153, and the surface layer film 154 are stacked in this order from the ceramic body 11 side.

The base films 140 and 150 are made of a conductive material. For example, the base films 140 and 150 may contain copper (Cu), nickel (Ni), silver (Ag), gold (Au), platinum (Pt), palladium (Pd), titanium (Ti), tantalum (Ta), tungsten (W) or the like as a main component. As an example, the base films 140 and 150 may contain Cu as a main component. The main component means the component with the highest content molar ratio.

The base films 140 and 150 can be configured as, for example, at least one layer of sputtered film formed by sputtering, or at least one layer of baked film obtained by baking a conductive paste. Alternatively, the base films 140 and 150 may be configured as combination of a sputtered film and a baked film.

The first Ni films 141 and 151 are plating films formed by electrolytic plating, and are disposed on the base films 140 and 150, respectively. The first Ni films 141 and 151 contain Ni as a main component. In the multilayer ceramic capacitor 10, the first Ni films 141 and 151 covering the base films 140 and 150 block the penetration of moisture into the ceramic body 11, and high moisture resistance is thereby achieved.

The metal films 142 and 152 are disposed on the first Ni films 141 and 151, respectively. The metal films 142 and 152 contain a metal having a lower Young's modulus than Ni and being softer than Ni as a main component. Specifically, the metal films 142 and 152 preferably contain at least one of In, Bi, Al, Sn, Zn, Au, Ag, Pd, Cu, Ti, or Pt as a main component. The metal films 142 and 152 can be configured as, for example, plating films formed by electrolytic plating or electroless plating, sputtered films formed by sputtering, or the like.

The second Ni films 143 and 153 are plating films formed by electrolytic plating and disposed on the metal films 142 and 152, respectively. Similarly to the first Ni films 141 and 151, the second Ni films 143 and 153 also contain Ni as a main component. In the multilayer ceramic capacitor 10, even when the surfaces of the metal films 142 and 152 are oxidized by the heat treatment, by forming the second Ni films 143 and 153 after the heat treatment, high adhesion of the surface layer films 144 and 154 and high solder wettability during substrate mounting can be obtained on the surfaces of the second Ni films 143 and 153 that have not been subjected to the heat treatment.

The surface layer films 144 and 154 are plating films formed by electrolytic plating, and are disposed on the second Ni films 143 and 153, respectively. The surface layer films 144 and 154 contain, for example, tin (Sn) as a main component. This configuration increases the reactivity between the external electrodes 14 and 15 and the solder during soldering for mounting the multilayer ceramic capacitor 10 to a mounting substrate, and sufficiently bonds the solder and the external electrodes 14 and 15.

Configuration of a Circuit Board 100

Figure 4:
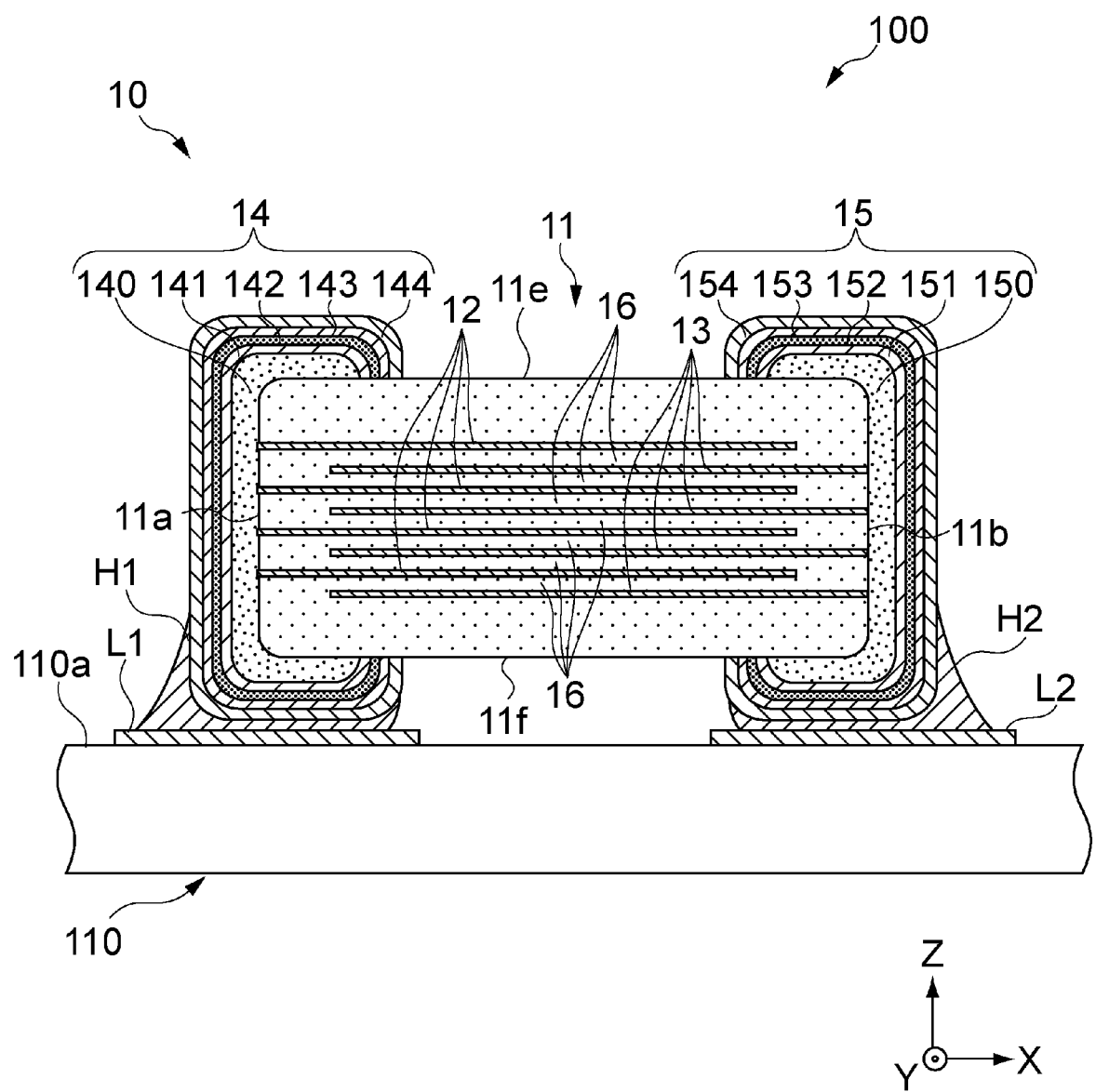
FIG. 4 is a cross-sectional view schematically illustrating a circuit board on which the multilayer ceramic capacitor is mounted.

FIG. 4 is a cross-sectional view illustrating the circuit board 100 of the present embodiment, and is a view illustrating a cross section corresponding to FIG. 2.

As illustrated in FIG. 4, the circuit board 100 includes a mounting substrate 110, the multilayer ceramic capacitor 10, first solder H1, and second solder H2.

The mounting substrate 110 is a substrate on which the multilayer ceramic capacitor 10 is mounted, and a circuit (not illustrated) may be formed thereon. The mounting substrate 110 has a mounting surface 110a facing the multilayer ceramic capacitor 10, and has a first land L1 and a second land L2 that are formed on the mounting surface 110a and are to be connected to the multilayer ceramic capacitor 10.

The first solder H1 connects the first land L1 of the mounting substrate 110 and the first external electrode 14. The second solder H2 connects the second land L2 of the mounting substrate 110 and the second external electrode 15. These solders H1 and H2 are formed by, for example, melting solder pastes applied to the lands L1 and L2 and wetting the external electrodes 14 and 15.

In the multilayer ceramic capacitor 10, the surface layer films 144 and 154 react well with the solder, thereby promoting solder wetting and sufficiently bonding the first solder H1 and the second solder H2 to the external electrodes 14 and 15.

Also, the wetting of the solder is affected not only by the surface layer films 144 and 154, but also by the surface conditions of the underlying layers. In the present embodiment, by providing the second Ni films 143 and 153 that have not been subjected to the heat treatment under the surface layer films 144 and 154, the wettability of the solder can be maintained satisfactorily.

In the multilayer ceramic capacitor 10 mounted on the mounting substrate 110, even when stress is applied because of deflection of the mounting substrate 110 or temperature change, the metal films 142 and 152 having a high flexibility act so as to relax the stress applied to the ceramic body 11 and the external electrodes 14 and 15, thereby inhibiting the occurrence of cracks. As a result, in the multilayer ceramic capacitor 10, a decrease in moisture resistance is less likely to occur, and thus high reliability is obtained.

In addition, in the multilayer ceramic capacitor 10 mounted on the mounting substrate 110, when excessive stress is applied, the metal films 142 and 152 sustain damage, such as peeling, first, thereby rapidly relaxing the stress. As a result, in the multilayer ceramic capacitor 10, it is possible to protect other components such as the ceramic body 11, whose functions are likely to be more seriously affected by damage.

Manufacturing Method of the Multilayer Ceramic Capacitor 10

Figure 5:
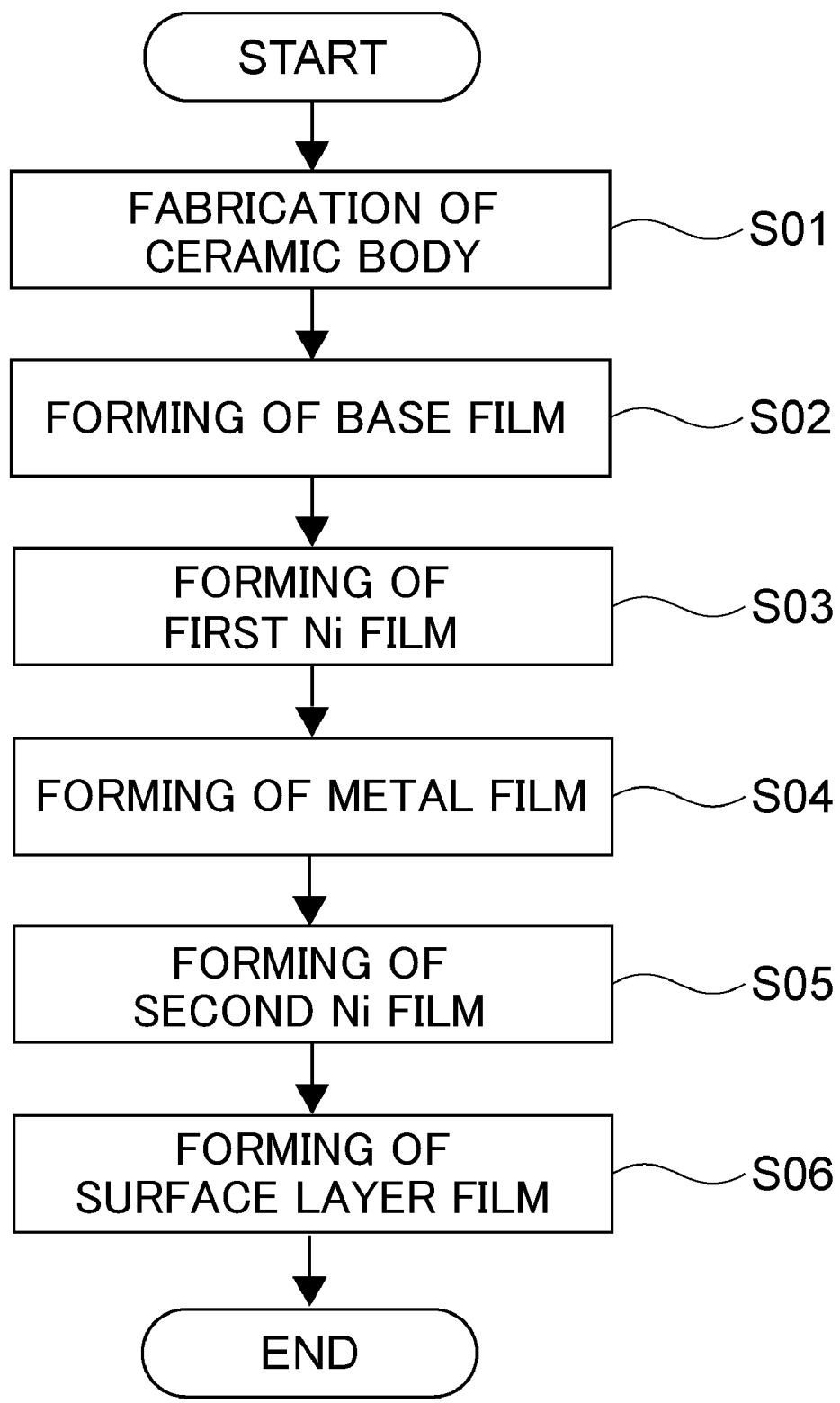
FIG. 5 is a flowchart illustrating a method of manufacturing the multilayer ceramic capacitor.
Figure 6:
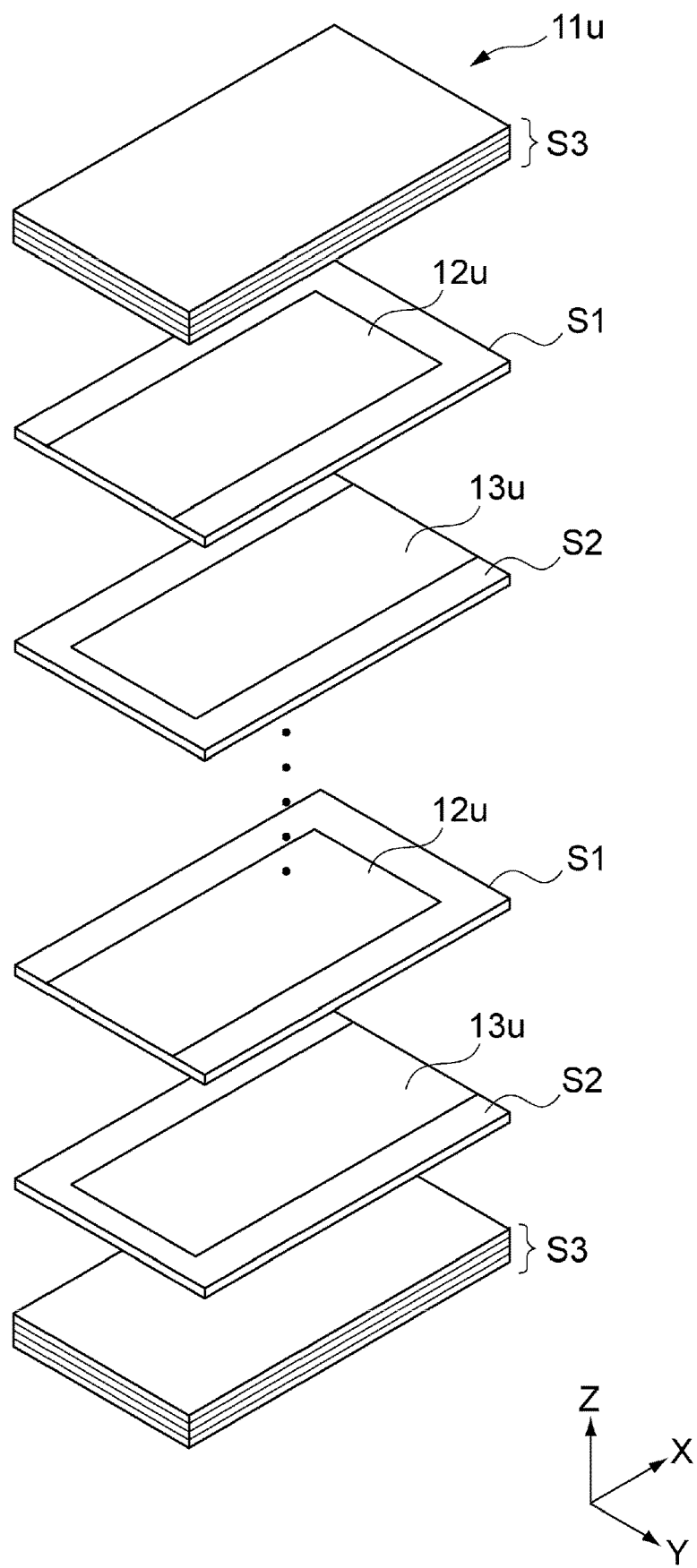
FIG. 6 is a perspective view illustrating a manufacturing process of the multilayer ceramic capacitor.

FIG. 5 is a flowchart illustrating a manufacturing method of the multilayer ceramic capacitor 10. FIG. 6 illustrates a manufacturing process of the multilayer ceramic capacitor 10. The method of manufacturing the multilayer ceramic capacitor 10 will be described along FIG. 5 and with appropriate reference to FIG. 6.

(Step S01: Fabrication of the Ceramic Body 11)

In step S01, first ceramic sheets S1, second ceramic sheets S2, and third ceramic sheets S3 are stacked as illustrated in FIG. 6 and fired to fabricate the ceramic body 11.

The ceramic sheets S1, S2, and S3 are configured as unfired dielectric green sheets containing dielectric ceramic as a main component. An unfired first internal electrode 12u corresponding to the first internal electrode 12 is formed on the first ceramic sheet S1, and an unfired second internal electrode 13u corresponding to the second internal electrode 13 is formed on the second ceramic sheet S2. No internal electrode is formed on the third ceramic sheet S3.

In the unfired ceramic body 11u illustrated in FIG. 6, the ceramic sheets S1 and S2 are alternately stacked, and the third ceramic sheets S3 are stacked on and under the stacked ceramic sheets S1 and S2 in the Z-axis direction. The unfired ceramic body 11u is integrated by pressure-bonding the ceramic sheets S1, S2, and S3 together. The number of the ceramic sheets S1, S2, and S3 is not limited to the example illustrated in FIG. 6.

Although the unfired ceramic body 11u corresponding to one ceramic body 11 has been described above, in actuality, a multilayer sheet is formed as a large-sized sheet that is not separated into individual pieces, and is then separated into individual ceramic bodies 11u.

By sintering the unfired ceramic body 11u, the ceramic body 11 illustrated in FIG. 1 to FIG. 3 is fabricated. The firing temperature can be determined based on the sintering temperature of the ceramic body 11u. For example, when a barium titanate-based material is used as the dielectric ceramic, the firing temperature can be about 1000 to 1300° C. The firing can be performed, for example, in a reducing atmosphere or in a low oxygen partial pressure atmosphere.
(Step S02: Forming of the Base Films 140 and 150)

In step S02, the base films 140 and 150 made of a conductive material are formed on the surface of the ceramic body 11 so as to be connected to the internal electrodes 12 and 13, respectively. The base films 140 and 150 are formed so as to cover the first end surface 11a and the second end surface 11b, respectively, in the present embodiment.

The base films 140 and 150 are formed by applying conductive pastes to the end surfaces 11a and 11b of the ceramic body 11 by, for example, dipping, printing, or the like, and then baking the pastes. In this case, the conductive material forming the base films 140 and 150 may contain, for example, Cu, Ni, Ag, Au, Pt, or Pd as a main component.

Alternatively, the base films 140 and 150 may be formed by sputtering. In this case, the conductive material forming the base films 140 and 150 may contain, for example, Ti, Ni, Ag, Au, Pt, Pd, Ta, or W as a main component.

The thickness of each of the base films 140 and 150 is 2 μm or greater and 50 μm or less. This configuration reduces the size of the multilayer ceramic capacitor 10 while reliably covering the end surfaces 11a and 11b with the base films 140 and 150. The thickness of each of the base films 140 and 150 is, for example, the thickness in each of the regions on the end surfaces 11a and 11b, and can be the dimension along the X-axis direction of the central portion of each of the base films 140 and 150 in the Z-axis direction and the Y-axis direction.
(Step S03: Forming of the First Ni Films 141 and 151)

In step S03, the first Ni films 141 and 151 are formed on the base films 140 and 150, respectively. The first Ni films 141 and 151 contain Ni as a main component and are formed by electrolytic plating.
(Step S04: Forming of the Metal Films 142 and 152)

In step S04, the metal films 142 and 152 are formed on the first Ni films 141 and 151, respectively. The metal films 142 and 152 contain a metal having a lower Young's modulus than Ni as a main component, and are formed by, for example, electrolytic plating, electroless plating, sputtering, or the like.
(Step S05: Forming of the Second Ni Films 143 and 153)

In step S05, the second Ni films 143 and 153 are formed on the metal films 142 and 152, respectively. The second Ni films 143 and 153 contain Ni as a main component and are formed by electrolytic plating.
(Step S06: Forming of the Surface Layer Films 144 and 154)

In step S06, the surface layer films 144 and 154 are formed on the second Ni films 143 and 153, respectively. The surface layer films 144 and 154 contain, for example, Sn as a main component and are formed by electrolytic plating.

The thickness of each of the surface layer films 144 and 154 is 3 μm or greater and 10 μm or less. This configuration reduces the size of the multilayer ceramic capacitor 10 while ensuring sufficient reactivity with solder. The thickness of each of the surface layer films 144 and 154 is, for example, the thickness in each of the regions on the end surfaces 11a and 11b, and can be the dimension along the X-axis direction of the central portion of each of the surface layer films 144 and 154 in the Z-axis direction and the Y-axis direction.

Through the above steps, the multilayer ceramic capacitor 10 is manufactured.

Heat Treatment to Reduce the Influence of Hydrogen

In the manufacturing method of the multilayer ceramic capacitor 10, it is preferable to perform a heat treatment to reduce the influence of hydrogen on the ceramic body 11. Details of the heat treatment in accordance with the present embodiment will be described.

In the plating process using an electrolytic plating method for forming the first Ni films 141 and 151, the metal films 142 and 152, the second Ni films 143 and 153, and the surface layer films 144 and 154, hydrogen, which has a strong effect to deteriorate the ceramic body 11, is generated. Hydrogen generated in the plating process is easily occluded in the base films 140 and 150, the first Ni films 141 and 151, the metal films 142 and 152, the second Ni films 143 and 153, and the surface layer films 144 and 154 of the external electrodes 14 and 15.

When the diffusion of the hydrogen occluded in the external electrodes 14 and 15 to the ceramic body 11 proceeds to the opposing section of the internal electrodes 12 and 13, the insulation resistance of the ceramic layer 16 between the internal electrodes 12 and 13 decreases. As a result, in the multilayer ceramic capacitor 10, an insulation failure is likely to occur, and thus reliability is reduced.

The hydrogen occluded in the external electrodes 14 and 15 is not limited to hydrogen generated in the plating process, and may be, for example, hydrogen contained in moisture such as water vapor in the atmosphere. Moreover, the hydrogen occluded in the external electrodes 14 and 15 may be in any possible state of hydrogen, such as a hydrogen atom, a hydrogen ion, or a hydrogen isotope.

The heat treatment in accordance with the present embodiment can be performed, for example, between step S04 (forming of the metal films 142 and 152) and step S05 (forming of the second Ni films 143 and 153). The heat treatment causes the hydrogen occluded in the ceramic body 11, the base films 140 and 150, the first Ni films 141 and 151, and the metal films 142 and 152 to be released to the outside and removed.

Furthermore, this heat treatment promotes recrystallization of the first Ni films 141 and 151, and the first Ni films 141 and 151 become structures for inhibiting diffusion of hydrogen. That is, the first Ni films 141 and 151 include recrystallized structures. Therefore, even when hydrogen is generated during the formation of the second Ni films 143 and 153 and the surface layer films 144 and 154, the diffusion of the hydrogen is inhibited by the first Ni films 141 and 151, and the penetration of hydrogen into the ceramic body 11 is prevented. In addition, entry of hydrogen from the outside of the multilayer ceramic capacitor 10 is also prevented. Therefore, in the multilayer ceramic capacitor 10, the diffusion of hydrogen into the ceramic body 11 is inhibited.

The recrystallized structure of the first Ni films 141 and 151 can be confirmed as a crystal structure with fewer dislocations and fewer lattice defects than the second Ni films 143 and 153. The recrystallized structure of the first Ni films 141 and 151 has larger crystal grains than those of the second Ni films 143 and 153. As a method for confirming these crystal structures, for example, a method in which the target surface is chemically polished and then observed with an optical microscope or scanning electron microscope (SEM) at a magnification of 500 to 5000 can be used.

For example, the recrystallized structure of the first Ni films 141 and 151 can be verified as follows. First, the structures of the first Ni films 141 and 151 and the second Ni films 143 and 153 are checked, and then the second Ni films 143 and 153 are subjected to the heat treatment similar to the heat treatment of the present embodiment (referred to as verification heat treatment), and the structure of the second Ni films 143 and 153 after the verification heat treatment is compared with the structure of the first Ni films 141 and 151 before the verification heat treatment. When the structure of the second Ni films 143 and 153 after the verification heat treatment has changed to the same structure as the structure of the first Ni films 141 and 151 before the verification heat treatment, it can be confirmed that the first Ni films 141 and 151 has become a recrystallized structure by the heat treatment of the present embodiment.

That is, in the present embodiment, the release of the hydrogen occluded in the ceramic body 11, the base films 140 and 150, the first Ni films 141 and 151, and the metal films 142 and 152 and the formation of the diffusion suppression layer that suppresses the diffusion of the hydrogen are performed in the same heat treatment process. Therefore, it is possible to obtain a configuration that is less likely to be adversely affected by hydrogen while minimizing the thermal load on the ceramic body 11 and the like due to the release of hydrogen and the formation of the diffusion suppression layer.

The heat treatment in accordance with the present embodiment is performed in a weakly oxidizing atmosphere or a reducing atmosphere. In the present embodiment, a weakly oxidizing atmosphere or a reducing atmosphere means an atmosphere with an oxygen concentration of 30 ppm or less. Thereby, oxidation of the surfaces of the metal films 142 and 152 is suppressed. The temperature of the heat treatment is equal to or higher than the temperature at which the first Ni films 141 and 151 are recrystallized, and specifically, can be 450° C. or higher and 800° C. or lower. Also, the heat treatment time can be, for example, 5 minutes or greater and 30 minutes or less.

Detailed description of the External Electrodes 14 and 15

The thickness of each of the first Ni films 141 and 151 is, for example, 1.0 µm or greater and 10.0 µm or less, more preferably 1.0 µm or greater and 4.5 µm or less. The thickness of each of the first Ni films 141 and 151 is, for example, the thickness in each of the regions on the end surfaces 11a and 11b, and can be the dimension along the X-axis direction of the central portion of each of the first Ni films 141 and 151 in the Z-axis direction and the Y-axis direction.

By adjusting the thickness of each of the first Ni films 141 and 151 to be 1.0 µm or greater, the first Ni films 141 and 151 sufficiently cover the base films 140 and 150, effectively suppressing diffusion of hydrogen. In addition, the components of the base films 140 and 150 are less likely to diffuse to the surfaces of the first Ni films 141 and 151, and the adhesion between the surfaces of the first Ni films 141 and 151 and the second Ni films 143 and 153 is enhanced. By adjusting the thickness of each of the first Ni films 141 and 151 to be 10.0 µm or less, the amount of hydrogen generated by the formation of the first Ni films 141 and 151 can be reduced, and the heat treatment conditions for releasing hydrogen can be relaxed. Furthermore, by adjusting the thickness of each of the first Ni films 141 and 151 to be 4.5 µm or greater, the thickness of each of the external electrodes 14 and 15 can be reduced, and miniaturization of the multilayer ceramic capacitor 10 can be achieved.

The thickness of each of the metal films 142 and 152 is, for example, 0.1 µm or greater and 10.0 µm or less. The thickness of each of the metal films 142 and 152 is, for example, the thickness in each of the regions on the end surfaces 11a and 11b, and can be the dimension along the X-axis direction of the central portion of each of the metal films 142 and 152 in the Z-axis direction and the Y-axis direction.

By adjusting the thickness of each of the metal films 142 and 152 to be 0.1 µm or greater, the function of relieving the stress in the metal films 142 and 152 can be effectively obtained. By adjusting the thickness of each of the metal films 142 and 152 to be 10.0 µm or less, it is possible to inhibit gaps from being formed between the first Ni films 141 and 151 and the second Ni films 143 and 153 when the solder is melted during mounting.

Also, the heat treatment reduces the hydrogen concentration of the first Ni films 141 and 151. On the other hand, the second Ni films 143 and 153 occlude hydrogen generated in the plating process after the heat treatment. Therefore, when heat treatment is performed, the hydrogen concentration of the second Ni films 143 and 153 becomes higher than the hydrogen concentration of the first Ni films 141 and 151. The hydrogen concentration can be the concentration (mol %) of hydrogen when Ni or its alloy, which is the main component of the Ni film, is defined as 100 mol %.

For example, secondary ion mass spectrometry (SIMS) is used to measure the hydrogen concentration. As a sample for measuring the hydrogen concentration, for example, the multilayer ceramic capacitor 10 cut parallel to the XZ plane can be used. The cross section of the sample is subjected to, for example, mirror polishing using diamond paste or the like so as to obtain sufficient smoothness for measurement.

The thickness of each of the second Ni films 143 and 153 is, for example, 0.5 µm or greater and 10.0 µm or less. The thickness of each of the second Ni films 143 and 153 is, for example, the thickness in each of the regions on the end surfaces 11a and 11b, and can be the dimension along the X-axis direction of the central portion of each of the second Ni films 143 and 153 in the Z-axis direction and the Y-axis direction.

By adjusting the thickness of each of the second Ni films 143 and 153 to be 0.5 µm or greater, the second Ni films 143 and 153 sufficiently cover the heat-treated metal films 142 and 152, respectively. As a result, the wettability of the solder during mounting can be sufficiently ensured, and the adhesion of the surface layer films 144 and 154 can be enhanced. By adjusting the thickness of each of the second Ni films 143 and 153 to be 10.0 µm or less, the thicknesses of the external electrodes 14 and 15 can be reduced, and miniaturization of the multilayer ceramic capacitor 10 can be achieved. Also, the total thickness of the first Ni film 141 and the second Ni film 143 and the total thickness of the first Ni film 151 and the second Ni film 153 are preferably 3.0 µm or greater, for example.

OTHER EMBODIMENTS

Although the embodiments of the present invention have been described above, the present invention is not limited to the above-described embodiments, and various modifications can be made without departing from the scope of the present invention.

For example, the metal films 142 and 152 may not be necessarily formed across the entire external electrodes 14 and 15, that is, the metal films 142 and 152 may not be necessarily formed across the entire first Ni films 141 and

151. In the multilayer ceramic capacitor 10, as long as the metal films 142 and 152 are present at least in the portions to be fixed to the mounting substrate through solder, the metal films 142 and 152 have the effect of relieving the stress.

Figure 7:
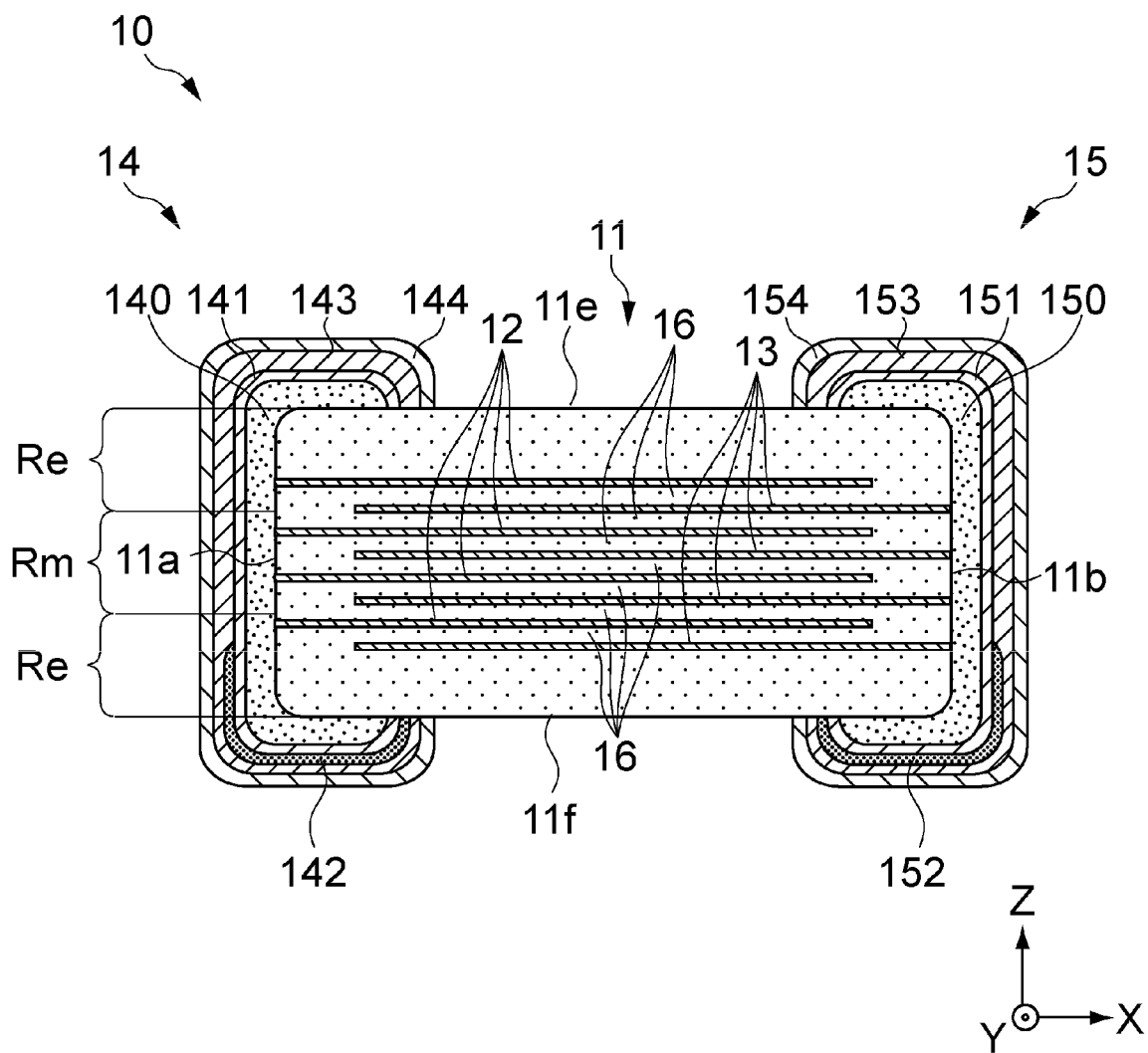
FIG. 7 is a cross-sectional view of another embodiment of the multilayer ceramic capacitor.

FIG. 7 illustrates three sections obtained by dividing the ceramic body 11 into three equal parts in the Z-axis direction, that is, a central section Rm, a pair of end sections Re located at the respective sides closer to the principal surfaces 11e and 11f of the central section Rm. As illustrated in FIG. 7, in the multilayer ceramic capacitor 10, the metal film 142 may be disposed only on the end section Re at the side of the second principal surface 11f facing the mounting surface of the mounting substrate in the ceramic body 11. In addition, in the multilayer ceramic capacitor 10, if it is not determined in advance which of the principal surfaces 11e and 11f faces the mounting surface of the mounting substrate, the metal films 142 are preferably disposed on both of the pair of the end sections Re.

The shapes of the external electrodes 14 and 15 are not limited to those illustrated in FIG. 1 and FIG. 2. For example, the external electrodes 14 and 15 may extend from the respective end surfaces 11a and 11b of the ceramic body 11 to only one principal surface, and have an L-shaped cross section parallel to the XZ plane. Alternatively, the external electrodes 14 and 15 do not have to extend to any of the principal surfaces and side surfaces. Also in this case, in the multilayer ceramic capacitor 10, the metal films 142 and 152 are preferably disposed on at least one of the pair of the end sections Re.

Furthermore, the structure of the external electrode is not limited to a five-layer structure, and may be a structure having six or more layers.

In addition, the present embodiments are applicable not only to multilayer ceramic capacitors, but also to multilayer ceramic electronic components in general that have external electrodes. Examples of multilayer ceramic electronic components to which the present embodiments can be applied include, in addition to multilayer ceramic capacitors, chip varistors, chip thermistors, multilayer inductors, and the like.

What is claimed is:

1. A multilayer ceramic electronic component comprising:
a ceramic body having a plurality of internal electrodes stacked in a direction of a first axis, and end surfaces perpendicular to a second axis orthogonal to the first axis, the plurality of internal electrodes being alternately led out to the end surfaces; and
external electrodes covering the end surfaces of the ceramic body, respectively,
wherein each of the external electrodes includes:
a base film formed on a corresponding one of the end surfaces and connected to the plurality of internal electrodes that are led out to the corresponding end surface,
a first Ni film formed on the base film,
a second Ni film formed on the first Ni film,
a surface layer film formed on the second Ni film, and
a metal film that is formed between the first Ni film and the second Ni film and contains a metal having a Young's modulus lower than that of Ni, as a main component, and
wherein the first Ni film has a recrystallized structure with fewer dislocations and fewer lattice defects than the second Ni film.

2. The multilayer ceramic electronic component according to claim 1, wherein in each of the external electrodes, the metal film is located on at least one of a pair of end sections of three sections that are defined by dividing the end surfaces of the ceramic body into three equal parts in the direction of the first axis.

3. The multilayer ceramic electronic component according to claim 2, wherein the metal film is provided across the entirety of the first Ni film.

4. The multilayer ceramic electronic component according to claim 1, wherein the metal film contains at least one of In, Bi, Al, Sn, Zn, Au, Ag, Pd, Cu, Ti, or Pt as a main component.

5. The multilayer ceramic electronic component according to claim 1, wherein the thickness of the metal film is 0.1 µm or greater and 10.0 µm or less.

6. The multilayer ceramic electronic component according to claim 1, wherein the thickness of the first Ni film is 1.0 µm or greater and 10.0 µm or less.

7. The multilayer ceramic electronic component according to claim 1, wherein the thickness of the second Ni film is 0.5 µm or greater and 10.0 µm or less.

8. The multilayer ceramic electronic component according to claim 1, wherein the base film contains Cu as a main component.

9. The multilayer ceramic electronic component according to claim 1, wherein the thickness of the base film is 2 µm or greater and 50 µm or less.

10. The multilayer ceramic electronic component according to claim 1, wherein the surface layer film contains Sn as a main component.

11. The multilayer ceramic electronic component according to claim 1, wherein the thickness of the surface layer film is 3 µm or greater and 10 µm or less.

12. A circuit board comprising:
a mounting substrate;
a multilayer ceramic electronic component that includes:
a ceramic body having a plurality of internal electrodes stacked in a direction of a first axis, and end surfaces perpendicular to a second axis perpendicular to the first axis, the plurality of internal electrodes being alternately led out to the end surfaces, and
external electrodes covering the end surfaces of the ceramic body, respectively; and
solder connecting the external electrodes and the mounting substrate,
wherein each of the external electrodes includes:
a base film formed on a corresponding one of the end surfaces and connected to the plurality of internal electrodes that are led out to the corresponding end surface,
a first Ni film formed on the base film,
a second Ni film formed on the first Ni film,
a surface layer film formed on the second Ni film, and
a metal film that is formed between the first Ni film and the second Ni film and contains a metal having a Young's modulus lower than that of Ni, as a main component, and
wherein the first Ni film has a recrystallized structure with fewer dislocations and fewer lattice defects than the second Ni film.

* * * * *